(No Model.)
O. STEINEN.
SHEARS.
No. 493,415. Patented Mar. 14, 1893.
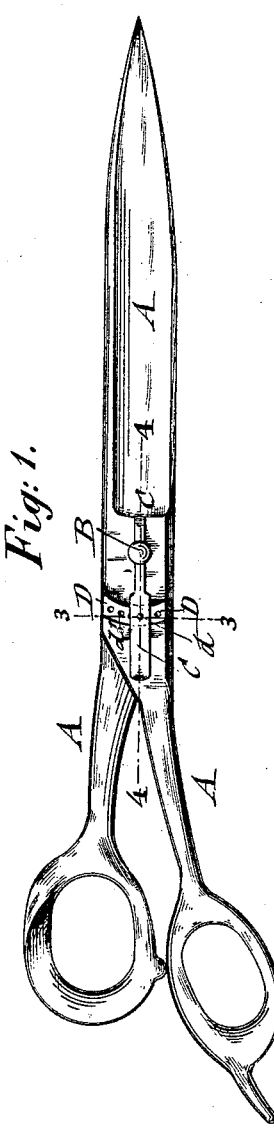
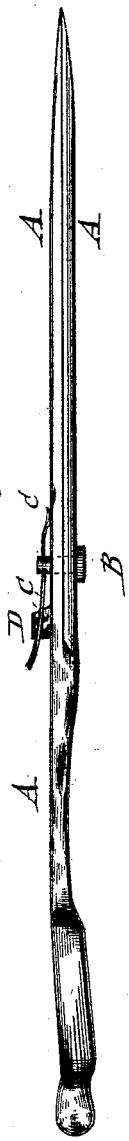
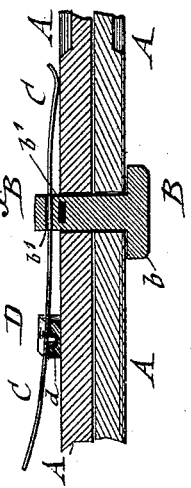
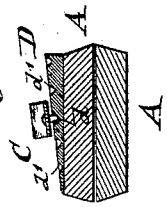
WITNESSES:
William Duehm
Charles Schroeder
INVENTOR
Otto Steinen
BY
Goepel & Raegener
ATTORNEYS.

UNITED STATES PATENT OFFICE.

OTTO STEINEN, OF OMAHA, NEBRASKA, ASSIGNOR OF ONE-HALF TO HERMANN KIND, OF STAPLETON, NEW YORK.

SHEARS.

SPECIFICATION forming part of Letters Patent No. 493,415, dated March 14, 1893.

Application filed August 13, 1892. Serial No. 442,991. (No model.)

*To all whom it may concern:*

Be it known that I, OTTO STEINEN, a citizen of the United States, and a resident of Omaha, Douglas county, Nebraska, have invented certain new and useful Improvements in Scissors and Shears, of which the following is a specification.

This invention relates to certain improvements in shears and scissors, whereby the tension of the blades can be accurately adjusted, so as to cut light or heavy fabrics with equal facility and by which the loosening of the blades is entirely avoided: and the invention consists of a pair of shears or scissors in which the blades are connected by a pivot, the shank of which is provided with openings through which a retaining-spring is passed, which presses at opposite sides of the pivot on one of the blades, the rear-end being adjusted to different degrees of tension by means of a raised and inclined bridge which is attached to the shank of the blade. The tension of the retaining-spring is adjusted by means of a pin attached to the rear-part of the spring, said pin engaging socket-holes in the inclined bridge, so as to increase or decrease the tension of the spring and permit the blades to cut light or heavy fabrics, as required.

In the accompanying drawings, Figure 1 represents a top-view of a pair of my improved scissors. Fig. 2 is a side-elevation of the same. Fig. 4 is a detail vertical longitudinal section on line 4, 4, Fig. 1, showing the pivot of the blades and the tension-spring of the same, and Fig. 3 is a detail transverse-section on line 3, 3, Fig. 1, showing the inclined bridge and the means for locking the tension-spring in position on the blade.

Similar letters of reference indicate corresponding parts.

Referring to the drawings, A A are the blades of my improved shears or scissors.

B is the pivot of the same, which is provided at the end with an enlarged head and in the end of its shank with openings $b'$ that are preferably arranged close to each other but at right angles with each other, as shown in Fig. 4. The shank of the pivot B is fitted loosely into the pivot-holes of the blades A, the upper end of the shank projecting somewhat beyond the upper blade A. Through the diametrical opening $b'$ of the pivot B is passed a narrow steel tension-spring C which is bent in such a manner that its front-end bears on the upper blade A in front of the pivot B, while its wider rear-end bears on an inclined arc-shaped bridge D that is applied to the shank of the upper blade at the opposite side of the pivot B, as shown clearly in Figs. 1 and 2. The wider rear-end of the tension-spring C is provided with a pin $d$ that engages corresponding socket-holes $d'$ arranged on the surface of the inclined bridge D, so that the tension-spring C can be set to different relative positions on the bridge and retained and locked in position thereon. When the spring C is in engagement with one of the socket-holes at the lower part of the bridge D, the spring exerts a smaller tension on the blades than when the same is in engagement with one of the socket-holes at the higher part of the bridge, in which position the spring exerts a greater degree of tension on the blades. When the blades are reduced in thickness by the wear caused by the sharpening of the same, the end of the tension-spring C is inserted into the lower opening $b'$ of the pivot B, so that it takes up the wear of the blades and prevents any slackening or loosening of the same, as the spring continues to exert the same degree of tension, even on the somewhat reduced or worn blades.

As the tension-spring forms two points of contact with the upper blade A, one in front, and the other at the rear of the connecting-pivot B, an even tension is imparted to the blades, so that the use of the shears or scissors is facilitated and the motion of the same is rendered easier and more uniform.

By the interlocking of the tension-spring with the socket-holes of the bridge, the tension-spring can never play loose, and consequently, the parts of the shears or scissors can never become detached from each other, except, when it is desired to separate the same for the purpose of cleaning or oiling the parts, in which case the tension-spring is detached and then the blades separated by removing the pivot-pin. They are connected again by passing the shank of the pivot through the holes in the blades and inserting the thinner end of the tension-spring through one of the openings in the shank of the pivot and placing the rear-end of the spring in engagement with one of the socket-holes of the bridge, after which the shears or scissors are ready for use.

The advantages of my improved shears and scissors are, first, the easy and uniform cutting-action of the same, secondly, the impossibility of the slackening or loosening of the parts, which is a great objection to shears and scissors heretofore in use, thirdly, the facility by which the tension of the blades can be adjusted according to the thickness of the fabrics which are to be cut, which is readily accomplished by the adjustment of the rear-end of the tension-spring on the inclined bridge, fourthly, the facility by which the tension-device can be adjusted to the blades of the shears or scissors, even after they are reduced considerably by wear.

Having thus described my invention, what I claim as new, and desire to secure by Letters Patent, is—

1. The combination, with the blades of a pair of shears or scissors, of a pivot having an enlarged head at one end and a diametrical slot at the opposite end, of a tension-spring, the front-end of which is passed through the opening in the pivot-pin, and an inclined transverse bridge arranged back of the pivot, with which the rear-end of the tension-spring is placed in contact, substantially as set forth.

2. The combination, with the blades of a pair of shears or scissors, of a pivot-pin having an enlarged head at one end and a diametrical opening in the opposite end, of a tension-spring the front-end of which is passed through the opening of the pivot-pin, and the rear end of which is provided with a pin, and an inclined bridge on the blade back of the pivot-pin, said bridge being provided with socket-holes or depressions which are engaged by the pin at the rear-end of a tension-spring, substantially as set forth.

In testimony that I claim the foregoing as my invention I have signed my name, in presence of two subscribing witnesses, at Omaha, in the State of Nebraska, on the 8th day of August, 1892.

OTTO STEINEN.

Witnesses:
ROBERT MERTENS,
CHARLES A. LUCKE.